United States Patent [19]
Burgdorf et al.

[11] Patent Number: 4,779,937
[45] Date of Patent: Oct. 25, 1988

[54] HYDRAULIC BRAKE SYSTEM PROVIDED WITH A WHEEL SLIP CONTROL

[75] Inventors: Jochen Burgdorf, Offenbach am Main; Hans-Dieter Reinartz, Frankfurt am Main, both of Fed. Rep. of Germany

[73] Assignee: Alfred Teves GmbH, Frankfurt am Main, Fed. Rep. of Germany

[21] Appl. No.: 31,389

[22] Filed: Mar. 27, 1987

[30] Foreign Application Priority Data

Apr. 9, 1986 [DE] Fed. Rep. of Germany ....... 3611931

[51] Int. Cl.$^4$ .............................................. B60T 8/44
[52] U.S. Cl. .................................... 303/119; 303/116
[58] Field of Search ........................ 303/116, 119, 113

[56] References Cited

U.S. PATENT DOCUMENTS 4,557,528 12/1985 Leiber ............................ 303/119 X
4,589,706 5/1986 Leiber ............................ 303/119 X

FOREIGN PATENT DOCUMENTS 3246923 6/1984 Fed. Rep. of Germany ...... 303/119
3505410 8/1986 Fed. Rep. of Germany ...... 303/116
2084676 4/1982 United Kingdom .
2158900 11/1985 United Kingdom .
2773270 10/1986 United Kingdom .
2178499 2/1987 United Kingdom .

Primary Examiner—Duane A. Reger
Assistant Examiner—Matthew C. Graham
Attorney, Agent, or Firm—James B. Raden; Robert P. Seitter

[57] ABSTRACT

A hydraulic brake system provided with a wheel slip control means (2) for use with automotive vehicles, comprising a master cylinder (2) pressurizable by a hydraulic force booster (1), wherein valve devices (32,33 and 34, 35, respectively) are provided between the master cylinder (2) and the wheel brakes (25, 26 and 30, 31, respectively) connected to the master cylinder. Pressure fluid is dischargeable through the valve devices from the wheel brakes 25, 26 and 30, 31, respectively) with pressure fluid discharged from the wheel brakes being replenishable by pressure fluid from the pressure chamber (10) of the hydraulic force booster (1) or an auxiliary pressure source (49). During the slip control, a stroke movement of the pedal brake (8) is effected in order to enable the hydraulic brake system to be employed both as a brake-slip-controlled system (ABS-system) and as a traction slip-controlled system (TSC-system). Pressure conduits (53, 54) are connected to the brake lines (51, 52) leading from the working chambers (16, 20) of the master cylinder (2) to the wheel brakes (25, 26, 30, 31) which, through the valve devices (37, 39 and 38, 40, respectively) can be connected to the pressure chamber (10) of the hydraulic booster and/or to the auxiliary pressure source (49). Locking valves (41, 42) are additionally provided in the brake conduits (51, 52) through which the connections of the brake conduits (51, 52) to the working chambers (16, 20) of the master cylinder (2) can be interpreted.

7 Claims, 2 Drawing Sheets

HYDRAULIC BRAKE SYSTEM PROVIDED WITH A WHEEL SLIP CONTROL

BACKGROUND OF THE INVENTION

The present invention relates to a hydraulic brake system provided with a wheel slip control means for use with automotive vehicles. The system comprises a master cylinder pressurizable by a hydraulic force booster. Valve means are provided between the master cylinder and the wheel brakes in communication with the master cylinder. Pressure fluid can be discharged from the wheel brakes through the valve means. The pressure fluid discharged from the wheel brakes is replenishable by pressure fluid from the pressure chamber of the hydraulic force booster or an auxiliary pressure source. The stroke of the brake pedal, during slip control, is reduced.

Conventional multi-circuit brake systems operating on the principle of the dynamic in-flow into a brake circuit and wherein the dynamic pressure corresponds to the pressure also acting on the hydraulic booster piston, have the disadvantage that in the event of a failure of the circuit both boosting and brake effect of the circuit are lost.

Further, other suggested brake systems (P No. 35 07 484.1) comprise a pedal-operated force booster furnished with a booster piston and a booster chamber wherein an auxiliary pressure proportional to the pedal force adjusts itself through a brake valve. These systems comprise a feed step cylinder provided with a step bore wherein a dual step piston is displaceably disposed, with a pressure chamber being provided ahead of the large step of the dual-step piston and a feed chamber being provided ahead of the small step. The pressure chamber is in communication with the one working chamber of the master cylinder. A check valve is provided in the line of communication connecting the booster chamber to the pressure chamber of the feed step cylinder and the control slide of the brake valve cooperating with a valve body through which the brake valve is in communication with the pressure chamber. This known brake system has the disadvantage that it involves comparatively large space requirements because the feed step cylinder is formed as an additional separate aggregate. Beyond that, it requires valves of comparatively complex design the operating safety of which is not always assured. Finally, a brake system of this type is not suitable for use with automotive vehicles that are provided with a traction slip control means.

For the control of the traction slip, it is known in the art to activate the wheel brake of the driving wheel tending to race and to decelerate the wheel to such an extent that it remains within a slip range favorable for the transfer of the driving moment (DE-PS No. 31 40 959; DE-OS No. 32 15 739). This will improve both the transfer of the driving performance to the road and the driving stability and, in the event of a front wheel, the steerability of the motor vehicle.

However, if the driving moment of the motor, after application of the brakes, cannot be reduced very quickly, the energy to be transformed into heat in the wheel brake will be so high that the brake will have to be released or otherwise a very high wear results. The overall efficiency degree of the drive will be adversely affected by this mode of operation.

It is an object of the present invention to so form a hydraulic brake system of the afore-mentioned type that it can be used both as a brake slip-controlled system and as a traction slip-controlled system. Beyond that, the brake system is to operate on valves of simple construction, preferably 2-way/2-position valves, and in the event of a failure of the auxiliary pressure source, it is to remain operable as a multi-circuit pedal-operated brake system. Finally, it is to be so arranged as to permit an automatic error check through pressure control valves of simple construction by pressure check switches such that, for example, upon occurrence of leakage, a partial shut-down is effected by actuating corresponding valves.

SUMMARY OF THE INVENTION

In the practice of the invention, this object is achieved in that pressure conduits are connected to the brake lines leading from the working chambers of the master cylinder to the wheel brakes, which pressure conduits, through valve means, can be connected to the pressure chamber of the hydraulic booster and/or the auxiliary pressure source. Locking valves are additionally switched into the brake lines through which the connections of the brake lines to the work chambers of the master cylinder can be interrupted.

Preferably, the hydraulically operable locking valve provided in the brake line is operable both by the pressure prevailing in the respective working chamber of the master cylinder and by the pressure prevailing in the section of the brake line connecting the locking valve to the wheel brakes. The brake line, through another pressure conduit, is in communication with a pair of way-valves of which the one valve, through a line, is connected to the pressure fluid return, and the other valve, through a second line, is in communication with the hydraulic booster. To permit a direct actuation of the brakes of the driven vehicle wheels, at least one of the brake lines, through a branch line, provided in which is another locking valve, is in communication with the auxiliary pressure source. In order to fully maintain the brake slip-controlling part of the system, while enabling a traction slip control to be performed, a pressure control valve is provided in the conduit connecting the pair of valves and the locking valve, respectively, to the auxiliary pressure source. To enable the full brake pressure to be developed in the static circuits, with exclusive pedal operation, a check valve is respectively provided in the pressure conduit connecting a pair of valves to the brake line. In order to check the serviceability of the pair of valves, a pressure check switch is provided in parallel to the one valve of the pair of valves to compare the pressure prevailing in one line with the pressure prevailing in the other line.

BRIEF DESCRIPTION OF THE DRAWING

The invention will now be described in greater detail in conjunction with the accompanying drawing wherein.

DETAILED DESCRIPTION

Figure 1:
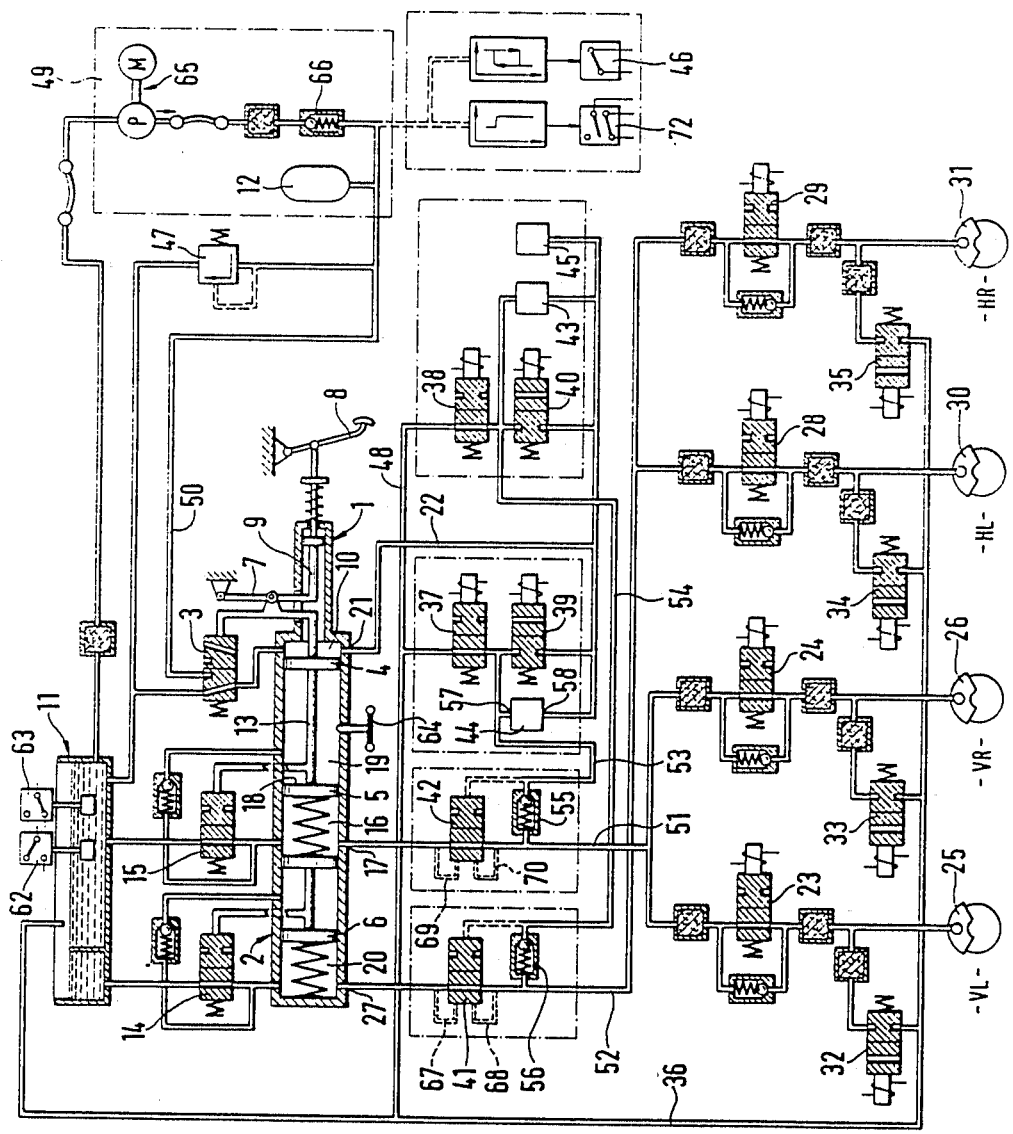
FIG. 1 illustrates a hydraulic brake system with slip control in accordance with the principles of the present invention; and, FIG. 2 is an embodiment similar to FIG. 1 and which is additionally provided with a traction slip control system.

With reference to the drawings, reference numeral 1, in FIG. 1, designates a hydraulic force booster which operates a tandem master cylinder 2. The hydraulic force booster comprises a brake valve 3 disposed substantially in parallel to the axis of a booster piston 4 and a master cylinder piston 5, 6 respectively. The brake valve 3, through a lever operation 7, is in communication with a push rod 9 connected by a brake pedal 8. The hydraulic force booster 1, moreover, includes a pressure chamber 10 which, in the brake releasing position, through valve 3, is in communication with a non-pressurized supply tank 11. When applying force to the brake pedal 8, pressure fluid is passed from a hydropneumatic accumulator 12 into the pressure chamber 10 such that a pressure proportional to the actuating force develops in the pressure chamber.

The master cylinder piston 5 is in coaxial relationship with the booster piston 4 and, through a rod 13 which is provided between the pistons 5, 4 is displaceable in the actuating direction. The master cylinder piston 5 confines a working chamber 16 of the master cylinder 2. The working chamber 16, normally, is in communication, through a valve 15 switching in response to the way, with the non-pressurized supply tank 11. The master cylinder piston 5 comprises an annular surface 18 confining an annular chamber 19. The master cylinder piston 6 is in coaxial relationship with the pistons 4, 5 and is hydraulically displaceable in the actuating direction by a pressure developing in the working chamber 16. The master cylinder piston 6 confines a second working chamber 20 which, in the brake releasing position, through a valve 14 corresponding to valve 15, is in communication with the non-pressurized supply tank 11.

A housing connection 17 terminates in the first working chamber 16, which connection is in communication, through electromagnetically actuatable 2-way/2-position valves 23, 24, with wheel brakes 25, 26 located, for example, on the front axle of a motor vehicle. Connected to the working chamber 20 of the master cylinder 2 is a housing connection 27 which, through electromagnetically operable valves 28, 29 is in communication with wheel brakes 30, 31 located, for example, on the rear axle of the automotive vehicle. Connected between electromagnetically actuable valves 23, 24, 28, 29 controllable by an electronic slip monitoring device (not shown) and normally taking a passage position, are electromagnetically actuable 2-way/2-position valves 32, 33, 34, 35 equally controllable by the electronic slip monitoring device (not shown) and, normally, taking a blocking position. Connected to the electromagnetically actuable 2-way/2-position valves 32, 33, 34, 35 is a common return line 36 leading to the non-pressurized supply tank 11. Because of a suitable reswitch of the 2-way/2-position valves associated to the wheel brakes it is possible for the pressure in each of the wheel brakes 30, 31, 25, 26 to be held constant or to be lowered irrespective of the pressures prevailing in the working chambers 16, 20, thereby avoiding an imminent inblocking condition.

The pressure chamber 10 of the hydraulic booster 1 comprises a connection 21 which, through a pressure line 22 is in communication with electromagnetically operable 2-way/2-position valves 39, 40 which, in currentless condition, are in their open position. Moreover, the pressure line 22 is in communication with the two pressure-check switches 43, 44 and the pressure switch 45. Coupled to the two 2-way/2-position valves 39, 40 are respectively further 2-way/2-position valves 37, 38 which, in turn, through a branch line 48 are in communication with the return conduit 36 and with the tank 11, respectively. In a normal braking operation, the brake valve 3 is driven by applying the brake pedal 8 through the lever 7 and the pressure fluid from the auxiliary pressure source 49, through conduit 50, is fed into the pressure chamber 10. The booster pressure moves the booster piston 4 to the left and applies force to the two master cylinder pistons 5, 6. At the same time, valves 14, 15 in communication with the two working chambers 16, 20 will close so that brake pressure develops in brake lines 51, 52 to apply the wheel brakes 25, 26, 30, 31.

In the event that the electronic slip monitoring device signalizes the blocked condition of a wheel, the 2-way/2-position valves 41, 42 are switched to their locking position thereby discontinuing the out-flow of pressure fluid from the working chambers 16, 20. Immediately after locking of the valves 41, 42, the 2-way/2-position valves 37, 38 open so that line 22 to which controlled pressure is applied, through 2-way/2-position valves 39, 40 and branch lines 53, 54 or check valves 55, 56, respectively, is in communication with brake lines 51, 52. By actuating the corresponding 2-way/2-position valve 32 to 35, the pressure in the blocked wheel of the automotive vehicle can be lowered and raised, respectively, by opening a corresponding 2-way/2-position valve 23, 24, 28, 29. The electronic slip monitoring device preferably includes a program permitting a check for intact functioning of the brake system and for failure of special aggregates and for leakage in one of the brake circuits 51, 52, respectively. After such programming, first, the 2-way/2-position valves 39, 37 are switched into their locking position to thereby determine through the pressure check switch 44, whether an elevated pressure prevails on both of the connections 57, 58.

In the event that, for example, the pressure has decreased on connection 57 of the pressure check switch 44, this, clearly, is indicative of a leakage in the brake line 51. A corresponding pressure check function of the program will now also be performed through the pressure check valve 43 and the 2-way/2-position valves 38, 40. After completion of a slip control operation (i.e., with vehicle wheels rolling with no tendency to block), all valves are again switched back into the switch positions as shown in the drawing, and the two brake circuits 52, 52 again operate as static brake circuits to which the pressure prevailing in the working chambers 16, 20 is directly applied.

Figure 2:
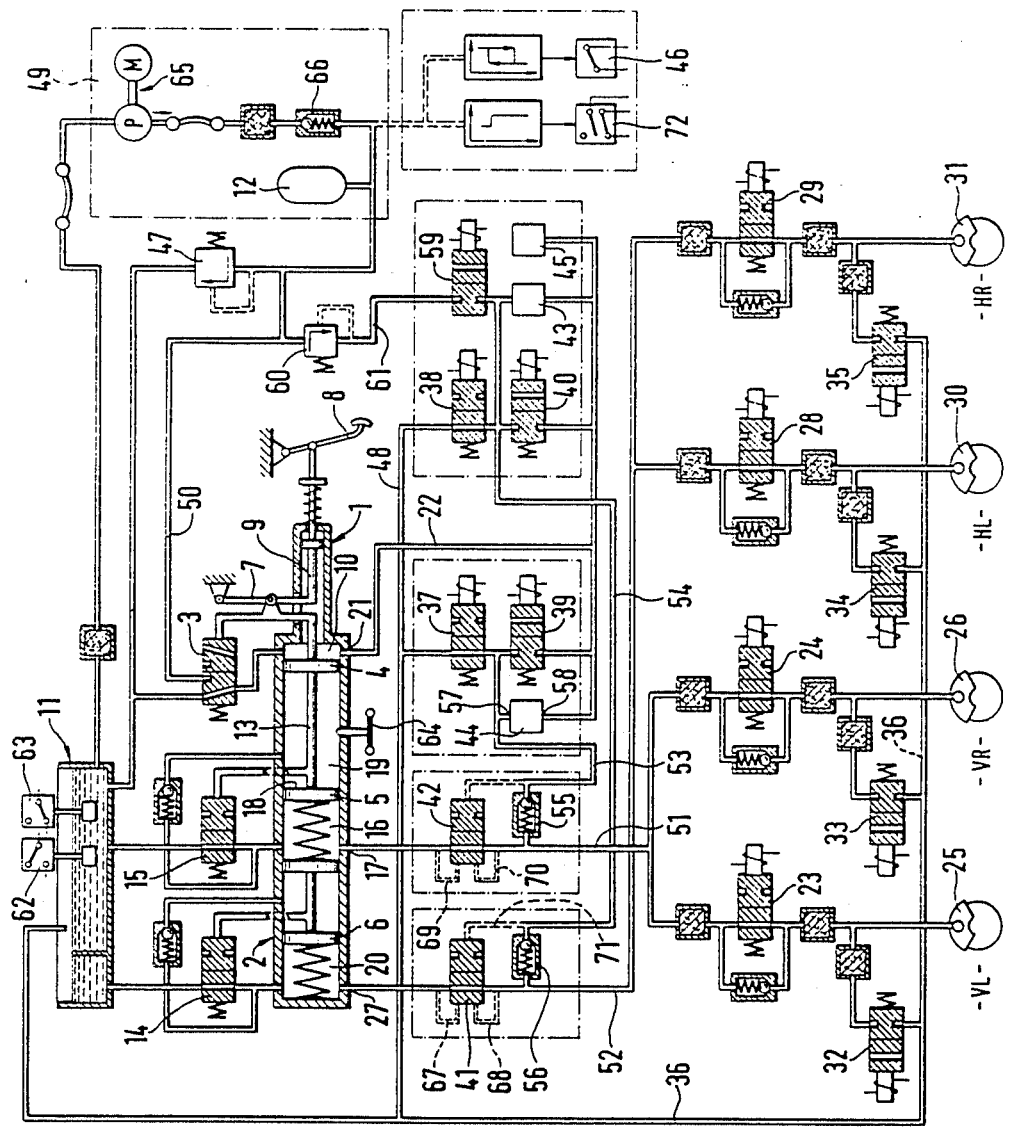

The embodiment according to FIG. 2 is distinguished from the one of FIG. 1 in that the anti-blocking brake system is additionally provided with a traction slip control system. The traction slip control system is composed of an additional 2-way/2-position valve 59, a pressure control valve 60 and a pressure line 61 through which the valve 59 is in communication with the pressure line 50 connecting the auxiliary pressure source 49 to the brake valve 3. In the event of a traction slip (as detected by the electronic slip monitoring device) valves 41, 42 are locked, whereas the pair of valves 37, 39 remain in the switch position as shown in the drawing and the valve 38 is switched into the locking position. At the same time, the 2-way/2-position valve 59 is switched to the passage position so that pressure fluid supplied by the auxiliary pressure source 49, can flow into the brake line 52 for the rear wheels 30, 31 through the check valve 56 at an in-flow pressure reduced by the pressure control valve to a predetermined value.

It should be noted that switches 62, 63 are pressure monitoring switches and warning switches, respectively, monitoring the pressure of the accumulator 12 and of the motor pump aggregate 65. Moreover, one warning switch 62 is provided for monitoring the brake function and another switch 63 is provided on the return tank 11 for monitoring the anti-blocking function.

Finally, it should be noted that the two hydraulically operable locking valves 41, 42 switched into the brake lines 51, 52, through control conduits 67, 68 and 69, 70, respectively, can be driven both by the pressure prevailing ahead of the respective locking valve 41 and 42, respectively, and by the pressure prevailing behind the respective locking valve 41 and 42, respectively. Also, the locking valve 59, which, on the one hand, is in communication with the auxiliary pressure source 49 through line 61, 50, and, on the other hand, through line 54, is in communication with the brake line 52, through a control line 71 connected to the locking valve 41.

What is claimed:

1. A hydraulic brake system provided with a wheel slip control means for use with automotive vehicles having vehicle wheels and wheel brakes, said system comprising a master cylinder pressurizable by a hydraulic force booster, wherein valve means are provided between the master cylinder and the wheel brakes in communication with the master cylinder, through which valve means pressure fluid is dischargeable from the wheel brakes, with pressure fluid discharged from the wheel brakes being replenishable by pressure fluid from one of a pressure chamber of the hydraulic force booster or an auxiliary pressure source, and wherein, during slip control operation, the stroke of the brake pedal is limited, wherein pressure conduits (54, 54) are connected to brake lines (51, 52) leading from working chambers (16, 20) of the master cylinder (2) to the wheel brakes (25, 26, 30, 31) which, through valve means (37, 39 and 38, 40, respectively), are connected to at least one of the pressure chamber (10) of the hydraulic booster and the auxiliary pressure source (49), and including locking valves (41, 42) which are switched into the brake conduits (51, 52) through which connections of the brake conduits (51, 52) to the working chambers (16, 20) of the master cylinder (2) are interrupted;

wherein the locking valve (41, 42) switched into the brake conduit (51, 52) is hydraulically actuable and is actuable both by the pressure prevailing in the respective working chamber (16, 20) of the master cylinder (2) and by the pressure prevailing in a section of a corresponding brake conduit (51 and 52, respectively) which connects the locking valve (41, 42) to the wheel brakes (25, 26 and 30, 31, respectively);

wherein the brake conduit (51 and 52, respectively), through another pressure conduit (53 and 54, respectively), is in communication with a pair of multidirectional valves (37, 39, and 38, 40, respectively) of which one valve (37 and 38, respectively) which connects the wheel brakes is in communication through a line (48), with the pressure fluid return (11, 36), and antoher valve (39 and 40, respectively) which connects the wheel brakes is in communication with the hydraulic booster (1) through a line (22); and wherein at least one brake conduit (52) is in communication through a branch line (54, 61) provided with another locking valve (59), with the auxiliary pressure source (49).

2. A hydraulic brake system according to claim 1, wherein a pair of valves are connected to said auxiliary pressure source at least one of the valves (40) of said pair of valves (38, 40) is in communication with the auxiliary pressure source (49) through a line (61) provided with another valve (60).

3. A hydraulic brake system according to claim 2, wherein a pressure control valve (60) is switched into the line (61) connecting said pair of valves (38, 40) and the valve (59), respectively, to the auxiliary pressure source (49).

4. A hydraulic brake system according to claim 3, wherein a check valve (55 and 56, respectively) is switched into the pressure conduit (53 and 54, respectively) connecting said pair of valves (37, 39, and 38, 40, respectively) to the brake conduit (51 and 52, respectively).

5. A hydraulic brake system according to claim 4, wherein a pressure check switch (44 and 43, respectively) is switched in parallel to the one valve (39 and 40, respectively) of said pair of valves (37, 39 and 38, 40, respectively) to compare the pressure prevailing in one line (22) of said lines to the pressure prevailing in other line (53, 54, respectively).

6. A hydraulic brake system according to claim 5, wherein the locking valve (41, 42) switched into the brake conduit (51, 52) is actuable by the pressure prevailing in the line (53, 54) connecting the brake conduit (51, 52) to said pair of valves (37, 39 and 38, 40, respectively).

7. A hydraulic brake system according to claim 6, wherein the locking valve (41) in the brake conduit (52) is actuable by the pressure prevailing in branch line (54) of said lines connecting the brake conduit (52) to the valve (59) which is in communication with the auxiliary force source (49) through one of said lines (61).

* * * * *